(12) United States Patent
Nishikido et al.

(10) Patent No.: US 11,846,698 B2
(45) Date of Patent: Dec. 19, 2023

(54) OBJECT DETECTION APPARATUS AND OBJECT DETECTION SYSTEM

(71) Applicant: KYOCERA Corporation, Kyoto (JP)

(72) Inventors: Masamitsu Nishikido, Yokohama (JP); Yukitoshi Kanayama, Yokohama (JP); Sunao Hashimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 724 days.

(21) Appl. No.: 16/967,718

(22) PCT Filed: Feb. 4, 2019

(86) PCT No.: PCT/JP2019/003876
§ 371 (c)(1),
(2) Date: Aug. 5, 2020

(87) PCT Pub. No.: WO2019/156025
PCT Pub. Date: Aug. 15, 2019

(65) Prior Publication Data
US 2021/0041551 A1    Feb. 11, 2021

(30) Foreign Application Priority Data
Feb. 6, 2018    (JP) .................................. 2018-018868

(51) Int. Cl.
*G01S 13/42*    (2006.01)
*G01S 13/931*    (2020.01)
*G08G 1/16*    (2006.01)

(52) U.S. Cl.
CPC ............ *G01S 13/42* (2013.01); *G01S 13/931* (2013.01); *G08G 1/16* (2013.01); *G01S 2013/9315* (2020.01)

(58) Field of Classification Search
CPC .......... G08G 1/167; G08G 1/16; G01S 13/42; G01S 2013/932; G01S 2013/9315; G01S 2013/9323; G01S 17/931; G01S 13/931
See application file for complete search history.

(56) References Cited

U.S. PATENT DOCUMENTS

| 6,097,332 | A  | * | 8/2000  | Crosby, II | ............... | G01S 13/88 |
|           |    |   |         |            |                 | 342/72     |
| 7,385,486 | B2 | * | 6/2008  | Danz       | ...................... | G08G 1/168 |
|           |    |   |         |            |                 | 340/436    |
| 9,064,408 | B2 | * | 6/2015  | Komoguchi  | ........... | G08G 1/167 |
| 10,351,129| B2 | * | 7/2019  | Luo        | ....................... | B60W 40/04 |
| 2003/0210172 | A1 | * | 11/2003 | Pleva    | ..................... | H01Q 13/18 |
|           |    |   |         |            |                 | 342/72     |

(Continued)

FOREIGN PATENT DOCUMENTS

JP    H0216484 A    1/1990
JP    H05-196736 A    8/1993

(Continued)

*Primary Examiner* — Peter M Bythrow
(74) *Attorney, Agent, or Firm* — Studebaker & Brackett PC

(57) ABSTRACT

An object detection apparatus includes an irradiator configured to irradiate a detection wave, a detector configured to detect a reflected wave of the detection wave, and a controller configured to estimate an arrival direction and a flight distance of the reflected wave. The controller is configured to perform an object detection process on a detection result of the reflected wave only when the arrival direction and the flight distance are included in a detection target range.

12 Claims, 22 Drawing Sheets

(56) References Cited

U.S. PATENT DOCUMENTS

| | | | | |
|---|---|---|---|---|
| 2004/0189451 A1* | 9/2004 | Zoratti | G08G 1/166 | 340/435 |
| 2004/0246170 A1* | 12/2004 | Woodington | H01Q 21/065 | 342/72 |
| 2007/0152803 A1* | 7/2007 | Huang | B60Q 1/535 | 340/435 |
| 2007/0182528 A1* | 8/2007 | Breed | B60W 30/16 | 348/148 |
| 2008/0018523 A1* | 1/2008 | Kelly, Jr. | G01S 7/354 | 342/21 |
| 2008/0211644 A1* | 9/2008 | Buckley | G08G 1/165 | 340/932.2 |
| 2008/0258884 A1* | 10/2008 | Schmitz | G01S 13/931 | 340/425.5 |
| 2008/0306666 A1* | 12/2008 | Zeng | B60Q 9/006 | 701/70 |
| 2009/0045928 A1* | 2/2009 | Rao | B60Q 9/006 | 340/435 |
| 2013/0054128 A1* | 2/2013 | Moshchuk | B60W 10/18 | 701/301 |
| 2014/0028451 A1* | 1/2014 | Takahashi | G08G 1/166 | 340/463 |
| 2014/0028487 A1* | 1/2014 | Ishimori | G01S 13/867 | 342/70 |
| 2016/0114804 A1* | 4/2016 | Kojima | G01S 17/86 | 701/1 |
| 2016/0272115 A1* | 9/2016 | Max | B60Q 9/008 | |
| 2019/0019412 A1* | 1/2019 | Roca | G01S 13/931 | |

FOREIGN PATENT DOCUMENTS

| | | | |
|---|---|---|---|
| JP | 2013057584 A | | 3/2013 |
| JP | 2017125702 A | * | 7/2017 |

* cited by examiner

FIG. 2
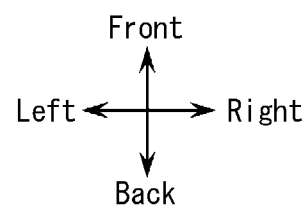
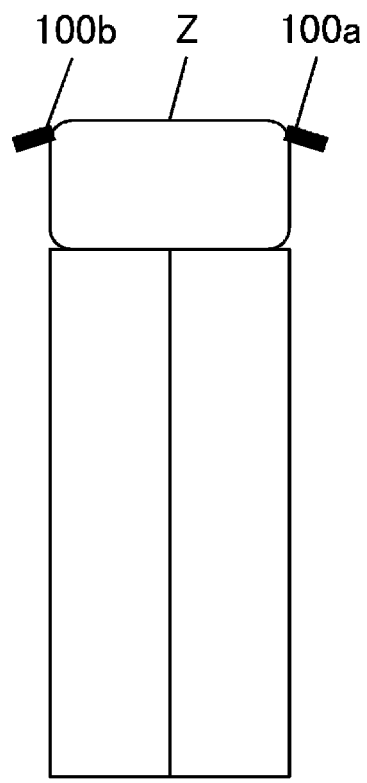

FIG. 4
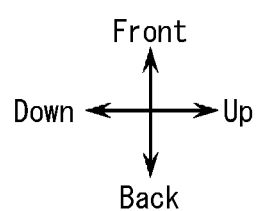
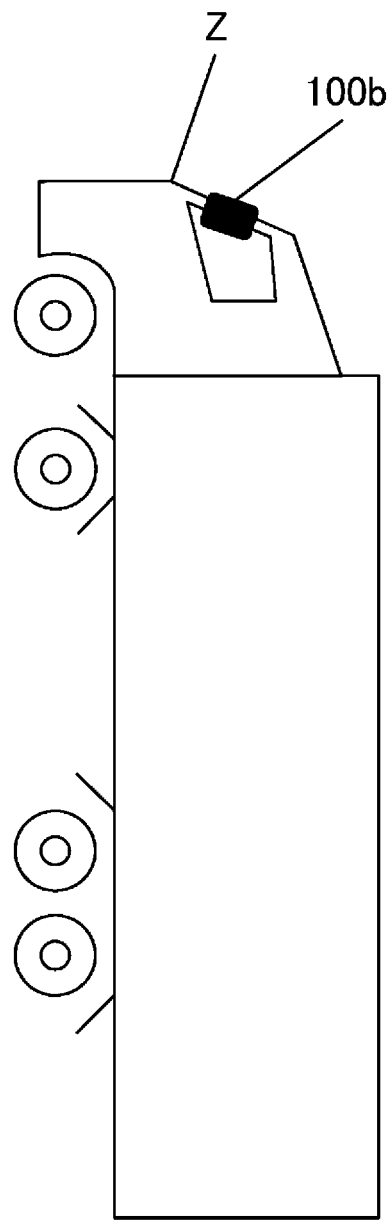

FIG. 5
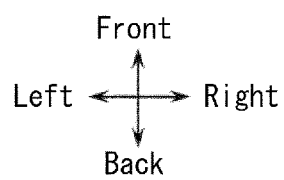
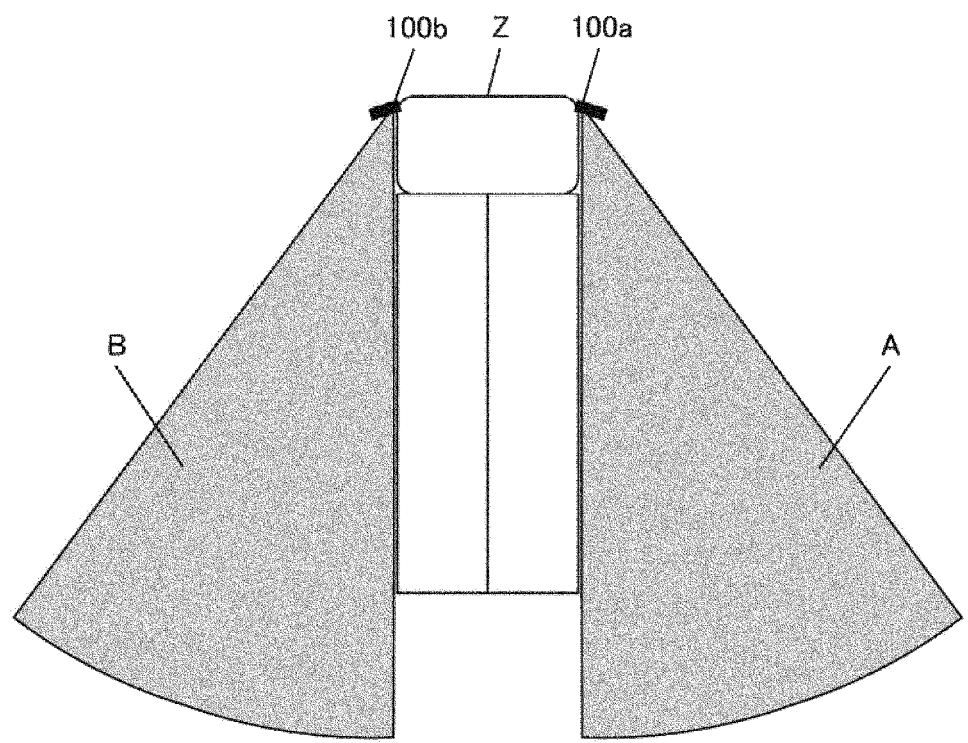

FIG. 6
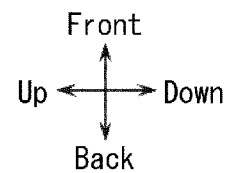
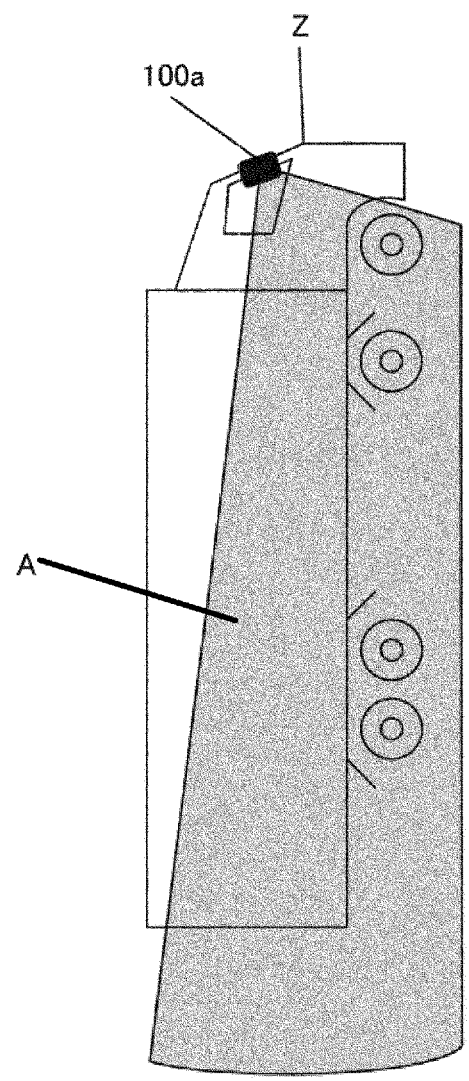

FIG. 7
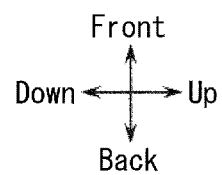
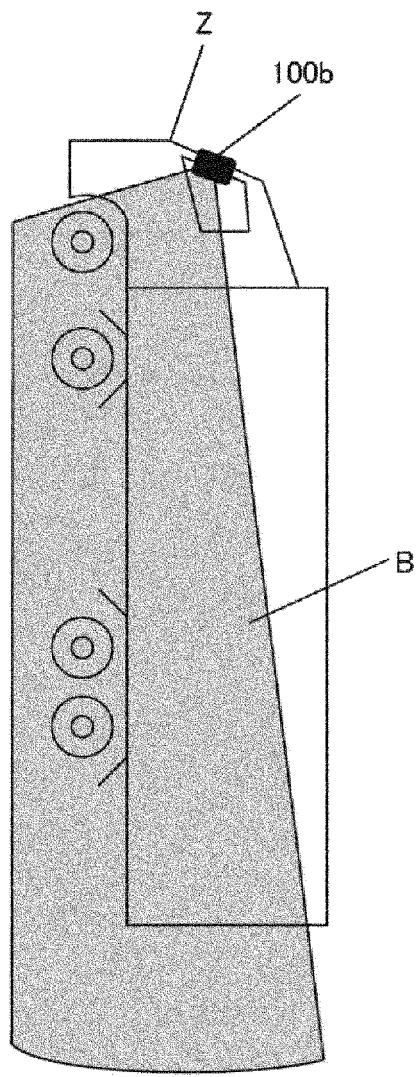

FIG. 8
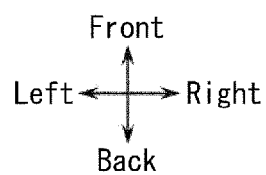
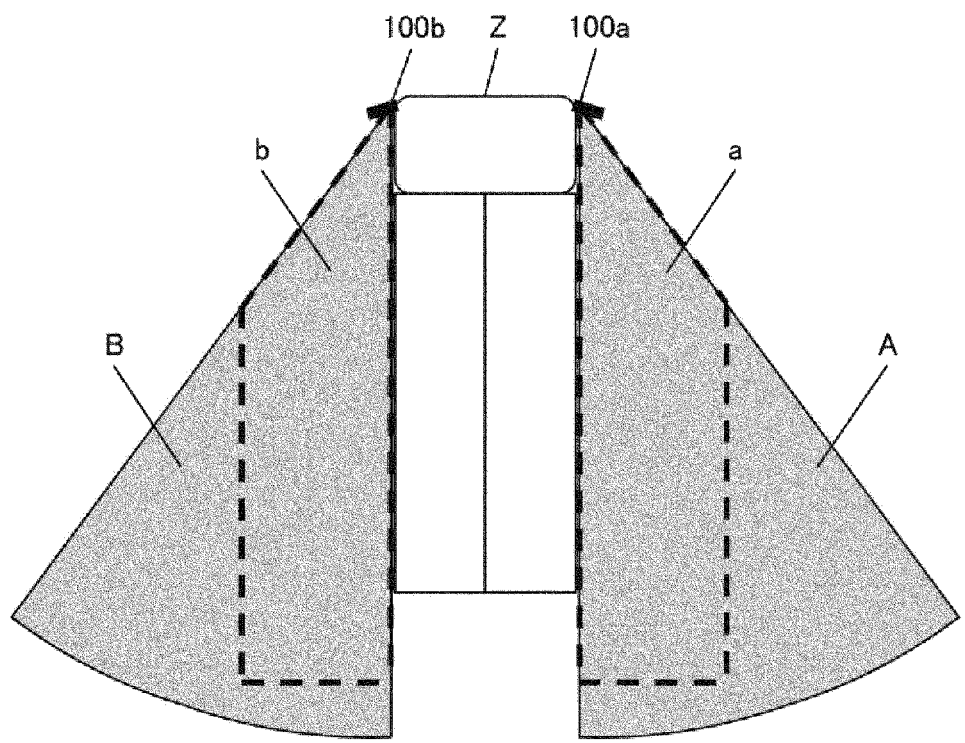

FIG. 9
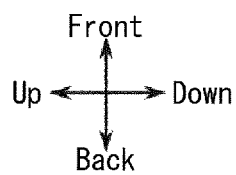
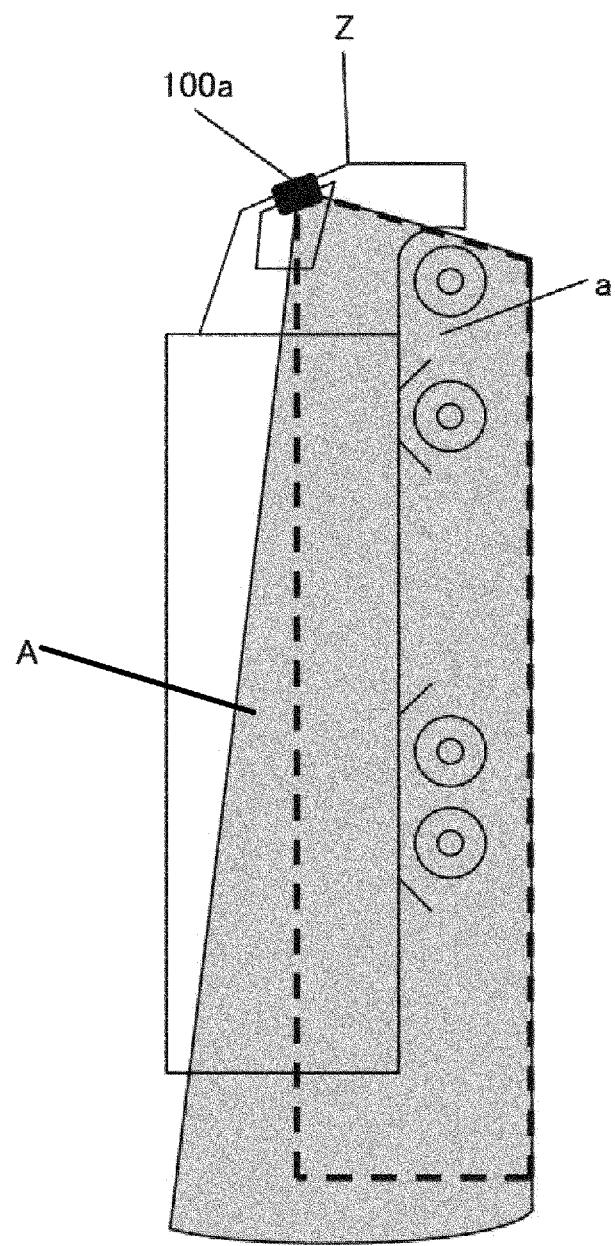

FIG. 10
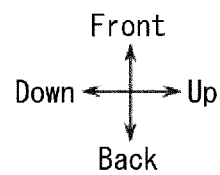
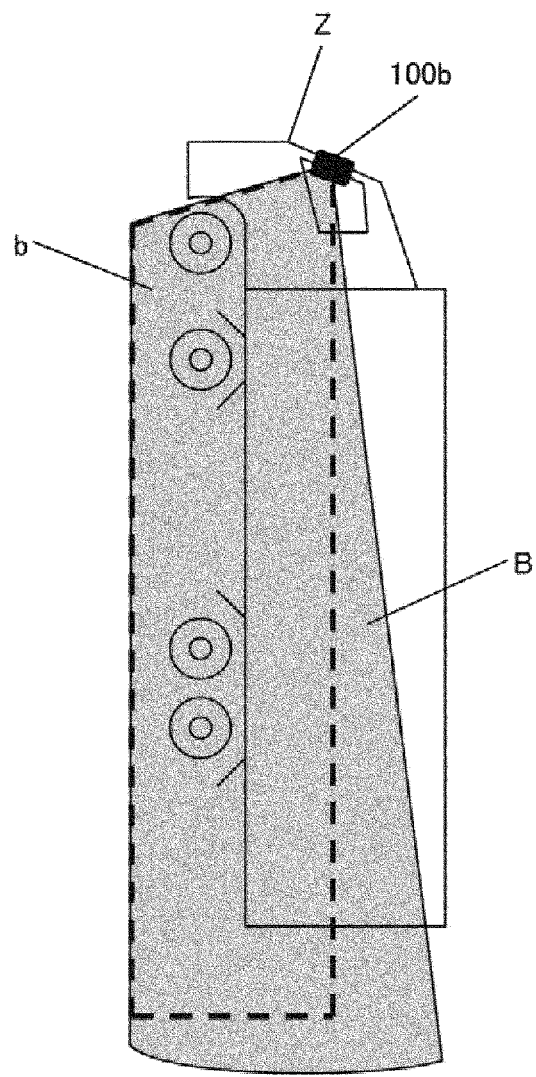

FIG. 11

| First detection target range Sa | | |
|---|---|---|
| $\theta a(rad)$ | $\phi a(rad)$ | $Ra(m)$ |
| $\theta a_1 \leq \theta a_2$ | $\phi a_1 \leq \phi a_2$ | $Ra_1 \leq Ra_2$ |
| $\theta a_3 \leq \theta a_4$ | $\phi a_3 \leq \phi a_4$ | $Ra_3 \leq Ra_4$ |
| $\theta a_5 \leq \theta a_6$ | $\phi a_5 \leq \phi a_6$ | $Ra_5 \leq Ra_6$ |
| $\theta a_7 \leq \theta a_8$ | $\phi a_7 \leq \phi a_8$ | $Ra_7 \leq Ra_8$ |
| $\theta a_9 \leq \theta a_{10}$ | $\phi a_9 \leq \phi a_{10}$ | $Ra_9 \leq Ra_{10}$ |
| ⋮ | ⋮ | ⋮ |

FIG. 12

| Second detection target range Sb | | |
|---|---|---|
| $\theta b(rad)$ | $\phi b(rad)$ | $Rb(m)$ |
| $\theta b_1 \leq \theta b_2$ | $\phi b_1 \leq \phi b_2$ | $Rb_1 \leq Rb_2$ |
| $\theta b_3 \leq \theta b_4$ | $\phi b_3 \leq \phi b_4$ | $Rb_3 \leq Rb_4$ |
| $\theta b_5 \leq \theta b_6$ | $\phi b_5 \leq \phi b_6$ | $Rb_5 \leq Rb_6$ |
| $\theta b_7 \leq \theta b_8$ | $\phi b_7 \leq \phi b_8$ | $Rb_7 \leq Rb_8$ |
| $\theta b_9 \leq \theta b_{10}$ | $\phi b_9 \leq \phi b_{10}$ | $Rb_9 \leq Rb_{10}$ |
| ⋮ | ⋮ | ⋮ |

FIG. 13
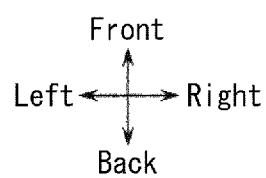
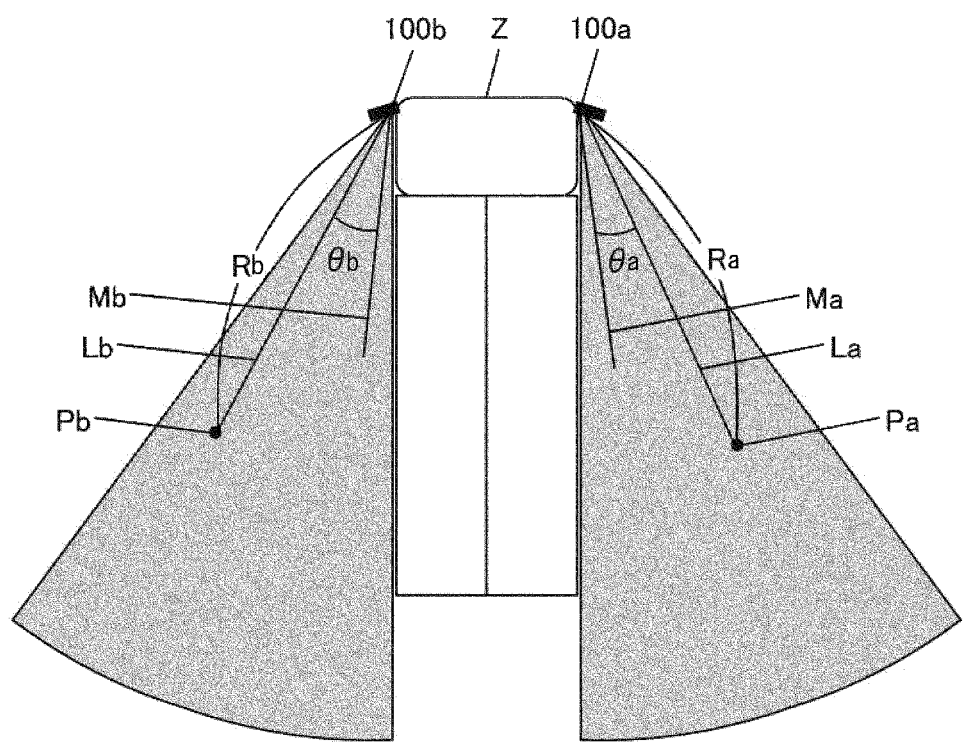

FIG. 14
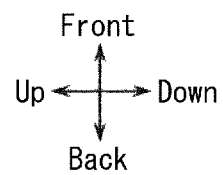
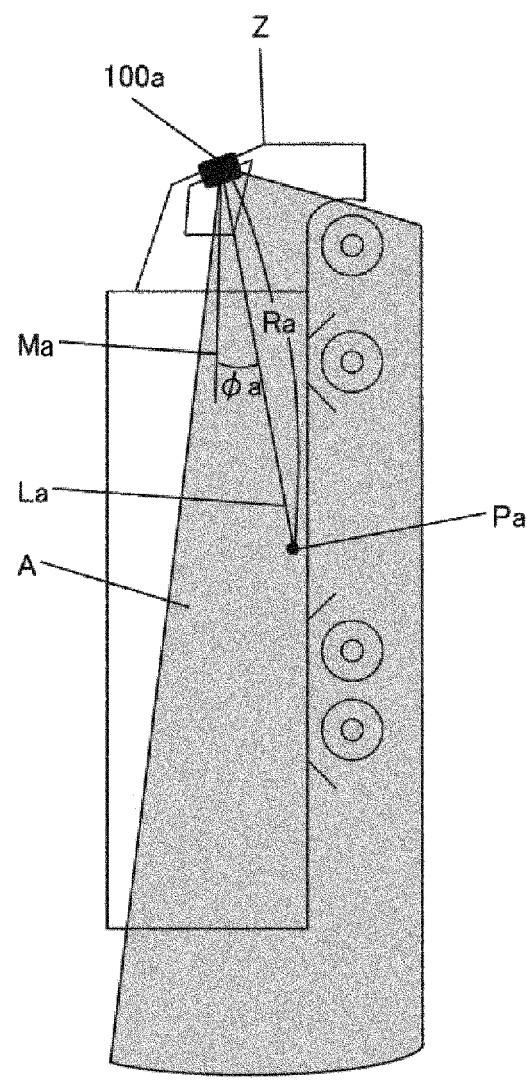

FIG. 17
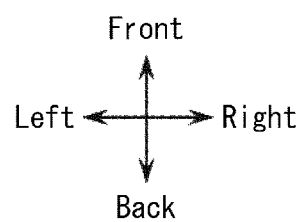
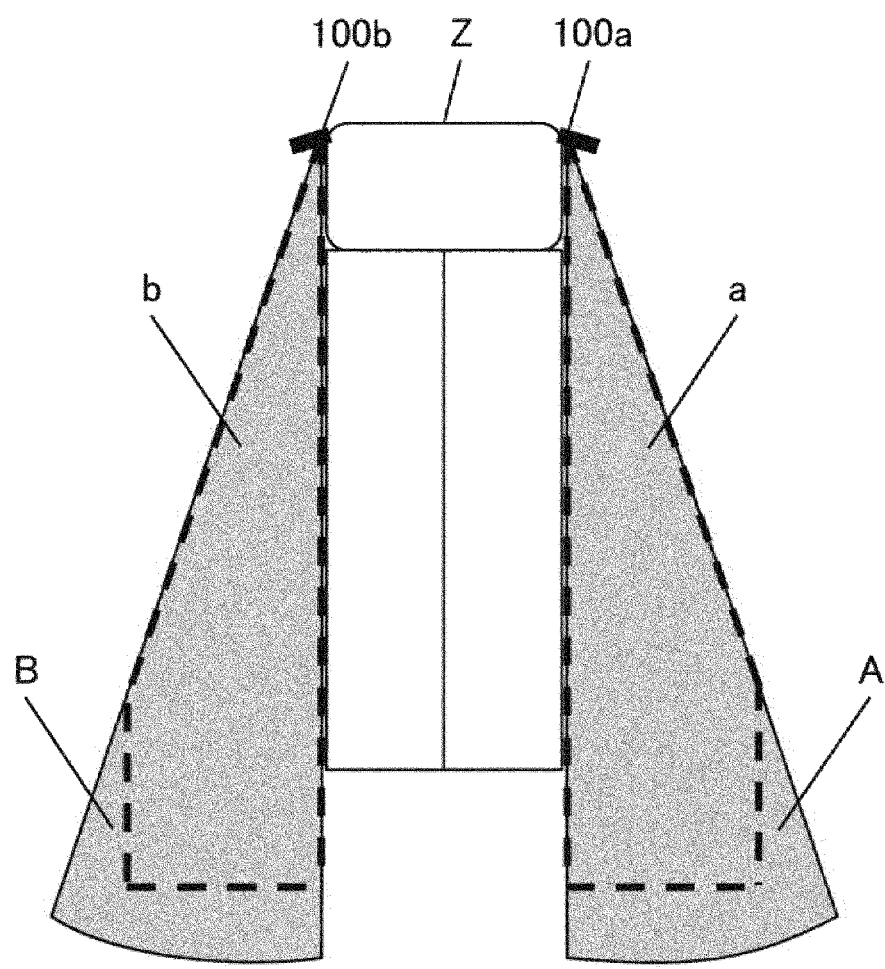

FIG. 19
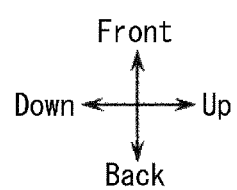
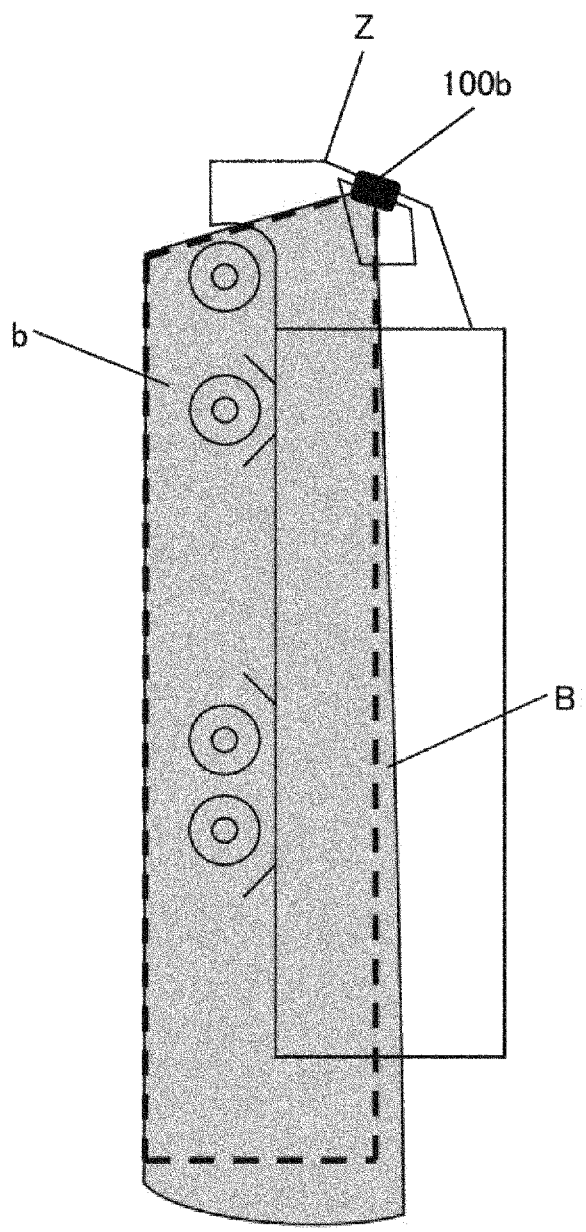

OBJECT DETECTION APPARATUS AND OBJECT DETECTION SYSTEM

CROSS-REFERENCE TO RELATED APPLICATION

The present application claims priority to and the benefit of Japanese Patent Application No. 2018-018868 filed Feb. 6, 2018, the entire contents of which are incorporated herein by reference.

TECHNICAL FIELD

The present disclosure relates to an object detection apparatus and an object detection system.

BACKGROUND

An object detection apparatus for detecting an object by irradiating millimeter waves and detecting reflected waves of the millimeter waves is known.

SUMMARY

An object detection apparatus according to the present disclosure includes an irradiator configured to irradiate a detection wave, a detector configured to detect a reflected wave of the detection wave, and a controller configured to estimate an arrival direction and a flight distance of the reflected wave. The controller is configured to perform an object detection process on a detection result of the reflected wave only when the arrival direction and the flight distance are included in a detection target range.

BRIEF DESCRIPTION OF THE DRAWINGS

In the accompanying drawings:

FIG. 2 illustrates an example of attaching an object detection apparatus to a vehicle in an object detection system according to an embodiment of the present disclosure;

FIG. 4 illustrates an example of attaching an object detection apparatus to a vehicle in an object detection system according to an embodiment of the present disclosure;

FIG. 5 illustrates an irradiation range of a detection wave by an object detection apparatus in an object detection system according to an embodiment of the present disclosure;

FIG. 6 illustrates an irradiation range of a detection wave by an object detection apparatus in an object detection system according to an embodiment of the present disclosure;

FIG. 7 illustrates an irradiation range of a detection wave by an object detection apparatus in an object detection system according to an embodiment of the present disclosure;

FIG. 8 illustrates a detection target range by an object detection apparatus in an object detection system according to an embodiment of the present disclosure;

FIG. 9 illustrates a detection target range by an object detection apparatus in an object detection system according to an embodiment of the present disclosure;

FIG. 10 illustrates a detection target range by an object detection apparatus in an object detection system according to an embodiment of the present disclosure;

FIG. 11 illustrates a first detection target range in an object detection system according to an embodiment of the present disclosure;

FIG. 12 illustrates a second detection target range in an object detection system according to an embodiment of the present disclosure;

FIG. 13 illustrates an irradiation range of a detection wave by an object detection apparatus in an object detection system according to an embodiment of the present disclosure;

FIG. 14 illustrates an irradiation range of a detection wave by an object detection apparatus in an object detection system according to an embodiment of the present disclosure;

FIG. 17 illustrates a detection target range by an object detection apparatus in an object detection system according to an embodiment of the present disclosure;

FIG. 19 illustrates a detection target range by an object detection apparatus in an object detection system according to an embodiment of the present disclosure;

DETAILED DESCRIPTION

In the object detection apparatus, it is useful to change the range targeted for an object detection process (detection target range). It is useful to change the detection target range not only in an apparatus that irradiates millimeter waves, but also an apparatus that irradiates detection waves such as electromagnetic waves or ultrasonic waves and detects an object by detecting the reflected waves thereof. The present disclosure relates to changing the detection target range of an object. An embodiment of the present disclosure enables changing of the detection target range of an object. Embodiments of the present disclosure are described below in detail with reference to the drawings.

Figure 1:
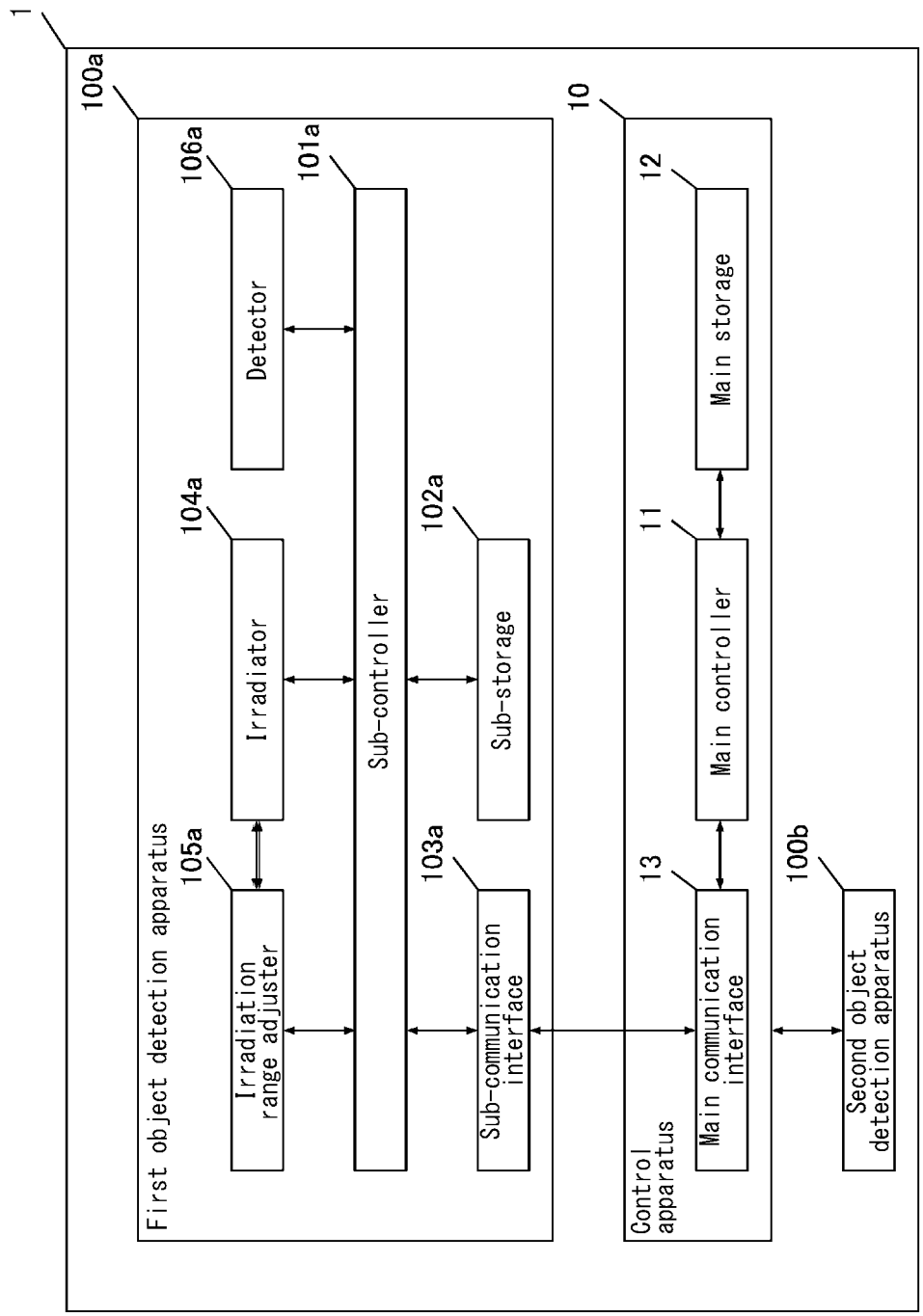
FIG. 1 is a block diagram schematically illustrating the functional configuration of an object detection system according to an embodiment of the present disclosure.

As illustrated in FIG. 1, an object detection system 1 according to an embodiment of the present disclosure includes a control apparatus 10, a first object detection apparatus 100a, and a second object detection apparatus 100*b*. Only the detailed configuration of the first object detection apparatus 100*a* is illustrated in FIG. 1, whereas the detailed configuration of the second object detection apparatus 100*b* is omitted.

The first object detection apparatus 100*a* and the second object detection apparatus 100*b* are configured by light detection and ranging or laser imaging detection and ranging (LIDAR), a millimeter wave radar, an ultrasonic sensor, a monocular camera, a stereo camera, an infrared camera, a night vision camera, or the like.

As illustrated in FIG. 1, the first object detection apparatus 100*a* includes a sub-controller 101*a*, a sub-storage 102*a*, a sub-communication interface 103*a*, an irradiator 104*a*, an irradiation range adjuster 105*a*, and a detector 106*a*.

The sub-controller 101*a* includes a processor that controls and manages the entire first object detection apparatus 100*a*. The sub-controller 101*a* may, for example, include a processor such as a central processing unit (CPU). The sub-controller 101*a* determines the irradiation range of a detection wave irradiated by the irradiator 104*a*. The sub-controller 101*a* performs an object detection process based on information related to the detection wave irradiated by the irradiator 104*a* and the reflected wave thereof detected by the detector 106*a*.

The sub-storage 102*a* is configured to include a semiconductor memory, a magnetic memory, or the like. The sub-storage 102*a* stores various data and programs for controlling the first object detection apparatus 100*a* and also functions as a working memory.

The sub-communication interface 103*a* exchanges a variety of data with the control apparatus 10, the second object detection apparatus 100*b*, or an external apparatus by wired or wireless communication.

The irradiator 104*a* irradiates a detection wave such as an electromagnetic wave or an ultrasonic wave. As the electromagnetic wave, the irradiator 104*a* irradiates visible light, infrared light, ultraviolet light, radio waves, microwaves, millimeter waves, or submillimeter waves, for example.

In accordance with the irradiation range determined by the sub-controller 101*a*, the irradiation range adjuster 105*a* adjusts the irradiation range of the detection wave irradiated by the irradiator 104*a*. The irradiation range adjuster 105*a* adjusts the irradiation range of the detection wave by, for example, the physical shape of an antenna, a lens, a mirror, or the physical shape of an ultrasonic transmitter.

The detector 106*a* detects a reflected wave of the detection wave irradiated from the irradiator 104*a*.

The first object detection apparatus 100*a* and the second object detection apparatus 100*b* have the same configuration in the object detection system 1 according to an embodiment of the present disclosure. Hence, a description of the detailed configuration of the second object detection apparatus 100*b* is omitted.

The first object detection apparatus 100*a* and the second object detection apparatus 100*b* are collectively referred to below as the object detection apparatus 100 when no distinction therebetween is made. The components in the second object detection apparatus 100*b* corresponding to the first object detection apparatus 100*a* are indicated by replacing the letter a in the reference sign of each component in the first object detection apparatus 100*a* with the letter b. The letters a and b are omitted when no distinction is made between the corresponding components of the first object detection apparatus 100*a* and the second object detection apparatus 100*b*.

As illustrated in FIG. 1, the control apparatus 10 includes a main controller 11, a main storage 12, and a main communication interface 13.

The main controller 11 includes a processor that controls and manages the entire object detection system 1. The main controller 11 includes a processor such as a CPU. The main controller 11 may perform the object detection process instead of the sub-controller 101*a* or the sub-controller 101*b*.

The main storage 12 is configured to include a semiconductor memory, a magnetic memory, or the like. The main storage 12 stores various data and programs for controlling the object detection system 1 and also functions as a working memory.

The main communication interface 13 exchanges a variety of data with each object detection apparatus 100 or an external apparatus by wired or wireless communication.

Figure 3:
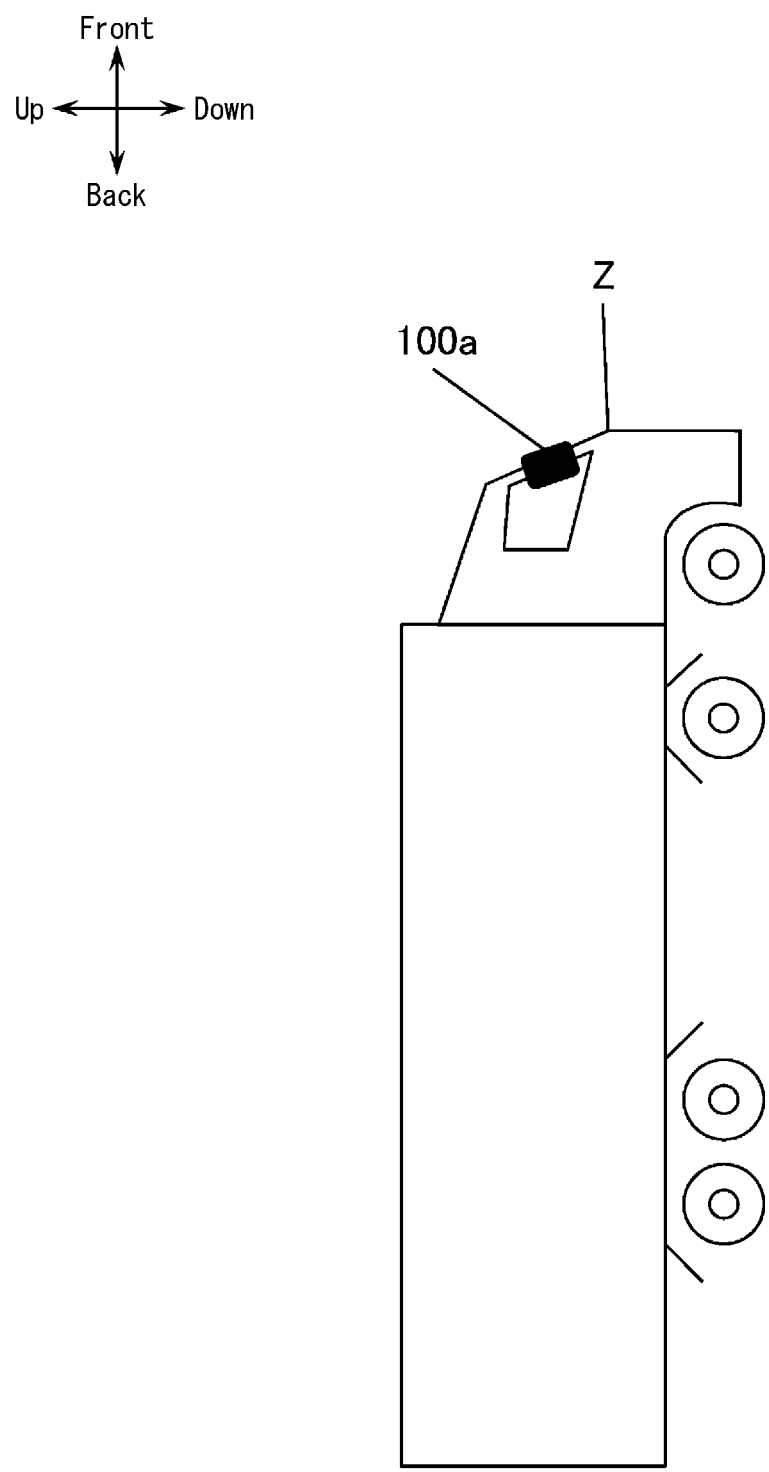
FIG. 3 illustrates an example of attaching an object detection apparatus to a vehicle in an object detection system according to an embodiment of the present disclosure.

In the object detection system 1 according to an embodiment of the present disclosure, the first object detection apparatus 100*a* and the second object detection apparatus 100*b* are respectively attached to the left and right side mirrors of a vehicle Z, as illustrated in FIGS. 2, 3, and 4. The vehicle Z is a wheeled vehicle in an embodiment of the present disclosure, but this example is not limiting.

In the object detection system 1 according to an embodiment of the present disclosure, the first object detection apparatus 100*a* and the second object detection apparatus 100*b* respectively irradiate a detection wave towards the right side and the left side of the vehicle Z, as illustrated in FIGS. 5, 6, and 7. The areas indicated by "A" and "B" in FIGS. 5, 6, and 7 are the irradiation ranges of the detected wave by the first object detection apparatus 100*a* and the second object detection apparatus 100*b*.

In the object detection system 1 according to an embodiment of the present disclosure, the first object detection apparatus 100*a* and the second object detection apparatus 100*b* may respectively cut out the range targeted for the object detection process (detection target range), as illustrated in FIGS. 8, 9, and 10. The areas indicated by "a" and "b" in FIGS. 8, 9, and 10 are the detection target ranges cut out by the first object detection apparatus 100*a* and the second object detection apparatus 100*b*.

Cutting out the detection target range refers to cutting out a detection target range from the detectable range of the reflected wave of the detection wave irradiated by the object detection apparatus 100. In other words, the object detection apparatus 100 in the object detection system 1 according to an embodiment of the present disclosure need not perform the object detection process on objects outside of the detection target range.

In the object detection system 1 according to an embodiment of the present disclosure, the detection target range of the first object detection apparatus 100*a* (first detection target range Sa) and the detection target range of the second object detection apparatus 100*b* (second detection target range Sb) are set in advance for each object detection apparatus 100. The first detection target range Sa is stored in the sub-storage 102*a* and the second detection target range Sb is stored in the sub-storage 102*b*, for example. The detection target range of the first object detection apparatus 100*a* and the detection target range of the second object detection apparatus 100*b* may be the same.

The first detection target range Sa in the object detection system 1 according to an embodiment of the present disclosure is defined by combinations of θa (rad), φa (rad), and Ra (m), as illustrated in FIG. 11. The second detection target range Sb in the object detection system 1 according to an embodiment of the present disclosure is defined by combinations of θb (rad), φb (rad), and Rb (m), as illustrated in FIG. 12.

As illustrated in FIGS. 13 and 14, φa (rad) in FIG. 11 is the horizontal component of the angle between a reference line Ma and a line segment La that connects the first object detection apparatus 100a and a point Pa, φa (rad) in FIG. 11 is the vertical component of the angle between the reference line Ma and the line segment La, and Ra (m) in FIG. 11 is the length of the line segment La. The direction of the point Pa as viewed from the first object detection apparatus 100a is defined by the angle θa (rad) and the angle φa (rad).

Figure 15:
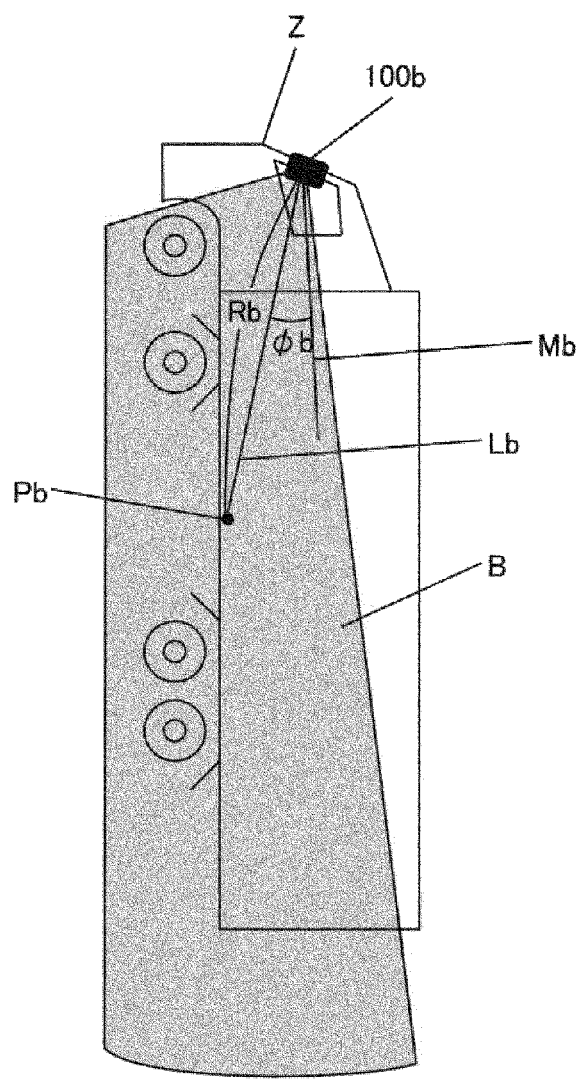
FIG. 15 illustrates an irradiation range of a detection wave by an object detection apparatus in an object detection system according to an embodiment of the present disclosure.

As illustrated in FIGS. 13 and 15, θb (rad) in FIG. 12 is the horizontal component of the angle between a reference line Mb and a line segment Lb that connects the second object detection apparatus 100b and a point Pb, φb (rad) in FIG. 12 is the vertical component of the angle between the reference line Mb and the line segment Lb, and Rb (m) in FIG. 12 is the length of the line segment Lb. The direction of the point Pb as viewed from the second object detection apparatus 100b is defined by the angle θb (rad) and the angle φb (rad).

Figure 16:
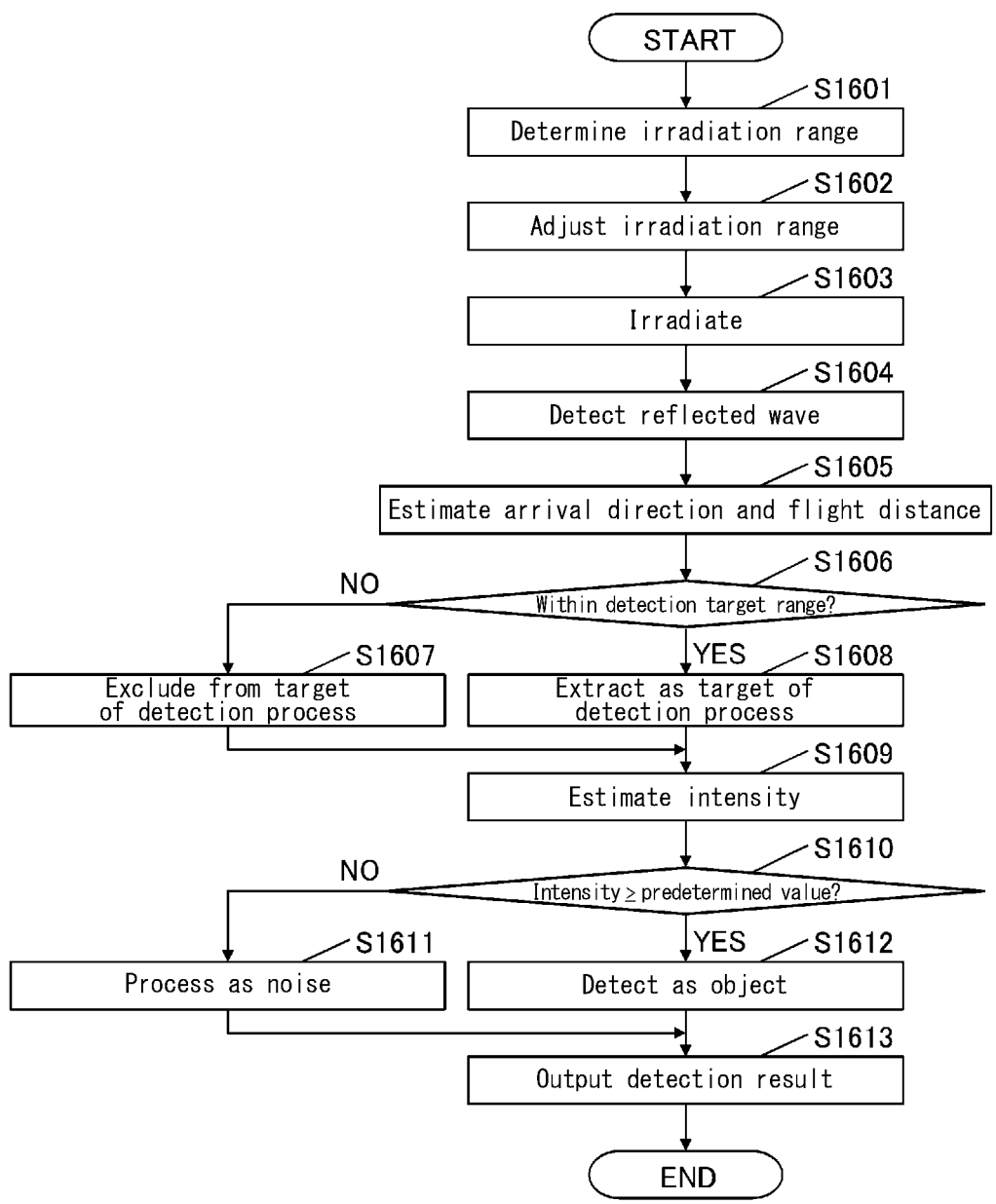
FIG. 16 is a flowchart illustrating a detection operation by an object detection apparatus in an object detection system according to an embodiment of the present disclosure.

The process from when the object detection apparatus 100 irradiates the detection wave until the object detection apparatus 100 outputs the detection result (object detection operation) is described with reference to FIG. 16.

The sub-controller 101 determines the irradiation range of the detection wave based on the detection target range and notifies the irradiation range adjuster 105 of the irradiation range (S1601).

In accordance with the irradiation range indicated by the sub-controller 101 in the process of S1601, the irradiation range adjuster 105 adjusts the irradiation range of the detection wave irradiated by the irradiator 104 (S1602). The irradiator 104 irradiates the detection wave (S1603).

The detector 106 detects a reflected wave of the detection wave irradiated from the irradiator 104 and notifies the sub-controller 101 of the detection result (S1604). The sub-controller 101 estimates an arrival direction and a flight distance of the detected reflected wave based on the detection result indicated by the detector 106 in the process of S1604 (S1605).

The sub-controller 101 judges whether the arrival direction and the flight distance estimated in the process of S1605 are within the detection target range (S1606).

When judging non-inclusion within the detection target range in the process of S1606 (S1606/NO), the sub-controller 101 excludes the detection result from the target of the object detection process (S1607). When judging inclusion within the detection target range (S1606/YES), the sub-controller 101 extracts the detection result as the target of the object detection process (S1608).

Based on the detection result, the sub-controller 101 estimates the intensity of the reflected wave of the target extracted in the process of S1608 (S1609).

The sub-controller 101 judges whether the intensity estimated in the process of S1609 is a predetermined value or greater (S1610). The predetermined value is an arbitrary value set in advance and is stored in the main storage 12 or the sub-storage 102, for example.

When judging that the intensity is not the predetermined value or greater in the process of S1610 (S1610/NO), the sub-controller 101 processes the target as noise (S1611). When judging that the intensity is the predetermined value or greater (S1610/YES), the sub-controller 101 detect the target as an object (S1612), outputs the object detection result (S1613), and ends the object detection operation. The process of at least one of S1609 to S1612 is an object detection process. The output destination of the object detection result is, for example, a system for warning the user of the vehicle Z by display or audio that the object is present or a system for automatically avoiding the object by supporting at least one of the operations of steering or braking the vehicle Z. However, these examples are not limiting.

The sub-controller 101 in the object detection system 1 according to an embodiment of the present disclosure may determine the irradiation range based on the detection target range. For example, the sub-controller 101 may determine the irradiation range so as to include the detection target range or determine the irradiation range so that the detection target range and the irradiation range overlap each other to the maximum degree.

Figure 18:
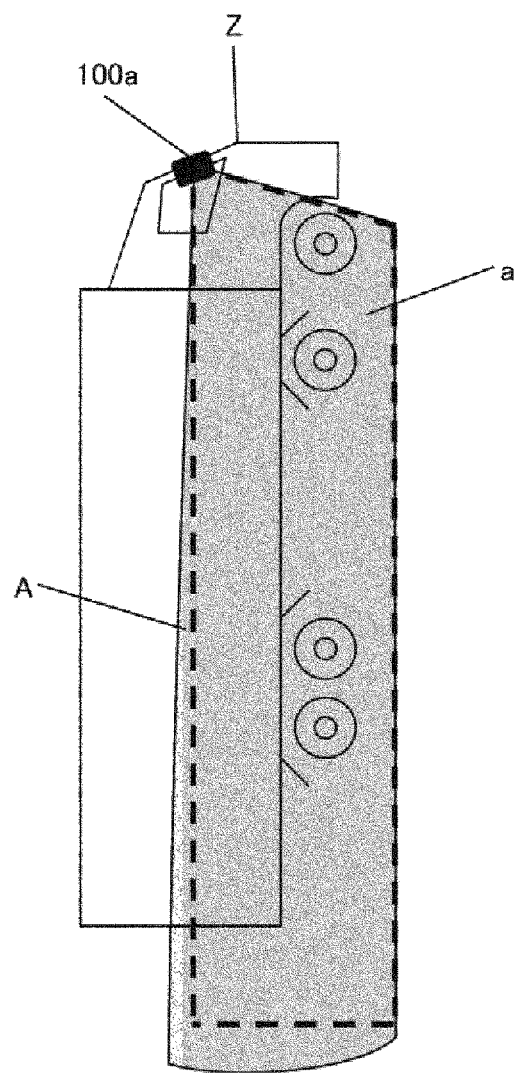
FIG. 18 illustrates a detection target range by an object detection apparatus in an object detection system according to an embodiment of the present disclosure.

The sub-controller 101 in the object detection system 1 according to an embodiment of the present disclosure may change the irradiation range based on the detection target range. For example, the sub-controller 101 may change the irradiation range illustrated in FIGS. 8, 9, and 10 to the irradiation range illustrated in FIGS. 17, 18, and 19.

Figure 20:
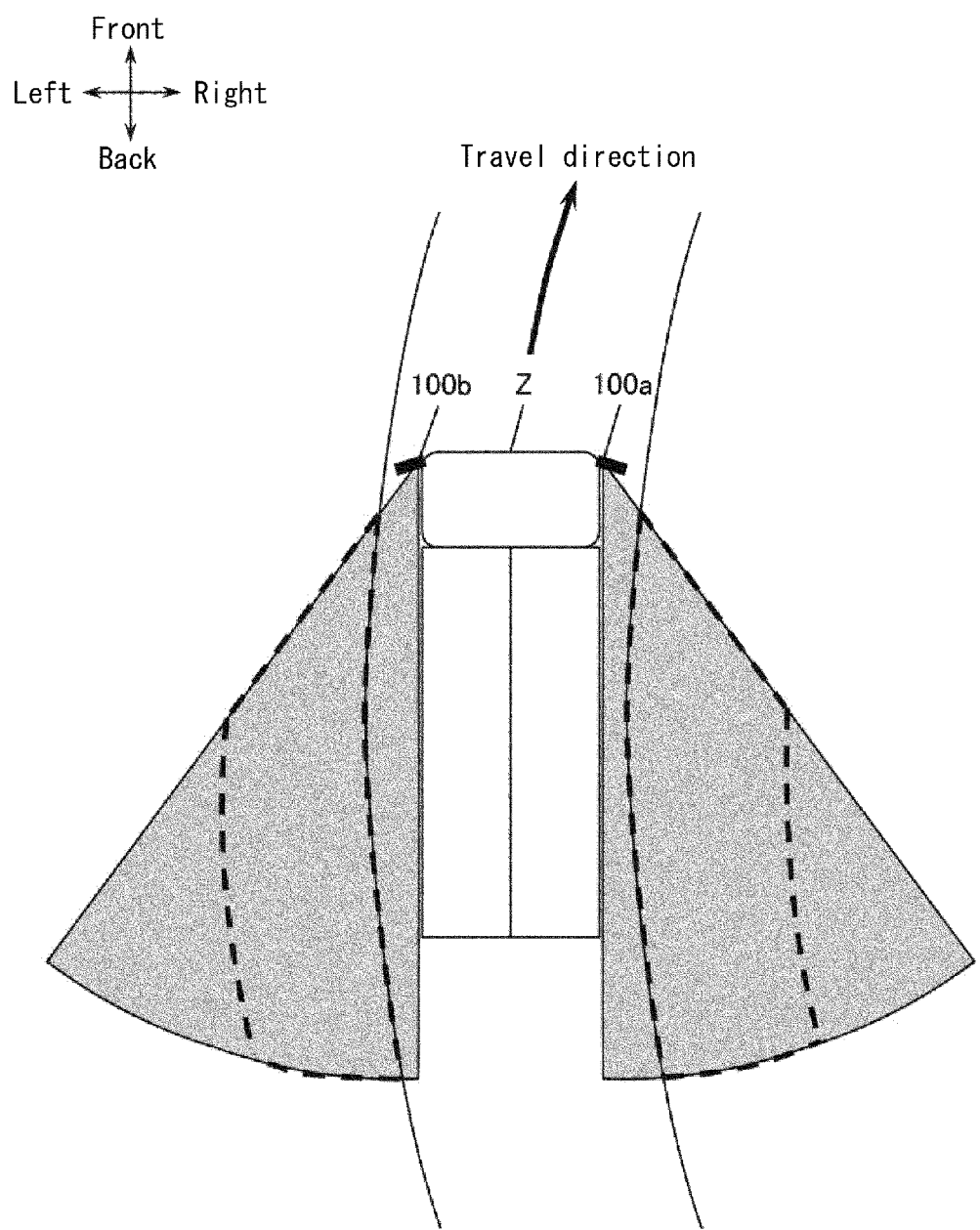
FIG. 20 illustrates a detection target range by an object detection apparatus in an object detection system according to an embodiment of the present disclosure.

The sub-controller 101 in the object detection system 1 according to an embodiment of the present disclosure may determine the detection target range based on the travel direction of the vehicle Z, as illustrated in FIG. 20.

Figure 21:
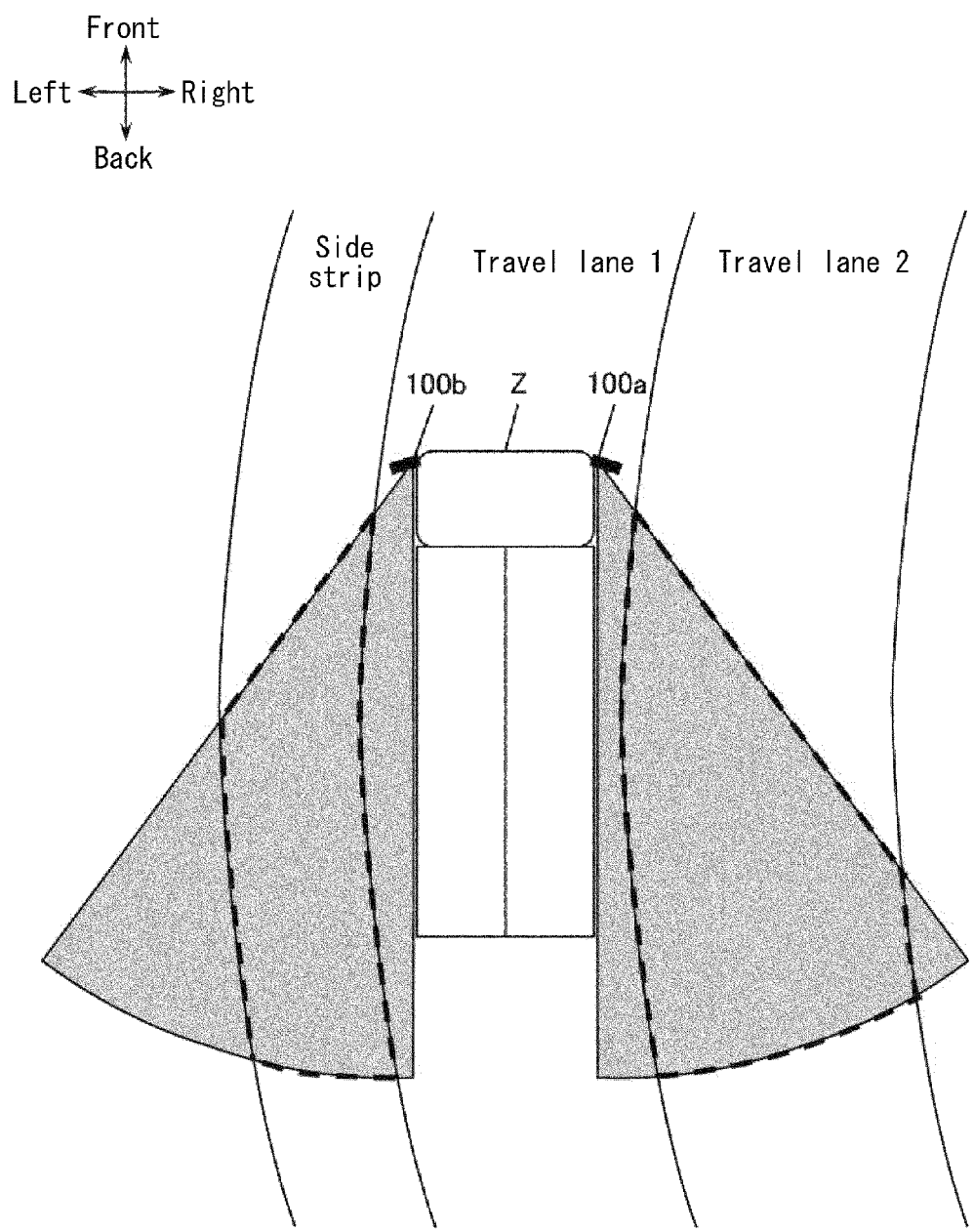
FIG. 21 illustrates a detection target range by an object detection apparatus in an object detection system according to an embodiment of the present disclosure.

The sub-controller 101 in the object detection system 1 according to an embodiment of the present disclosure may determine the detection target range based on the position of the travel lane in which the vehicle Z is traveling, as illustrated in FIG. 21.

Figure 22:
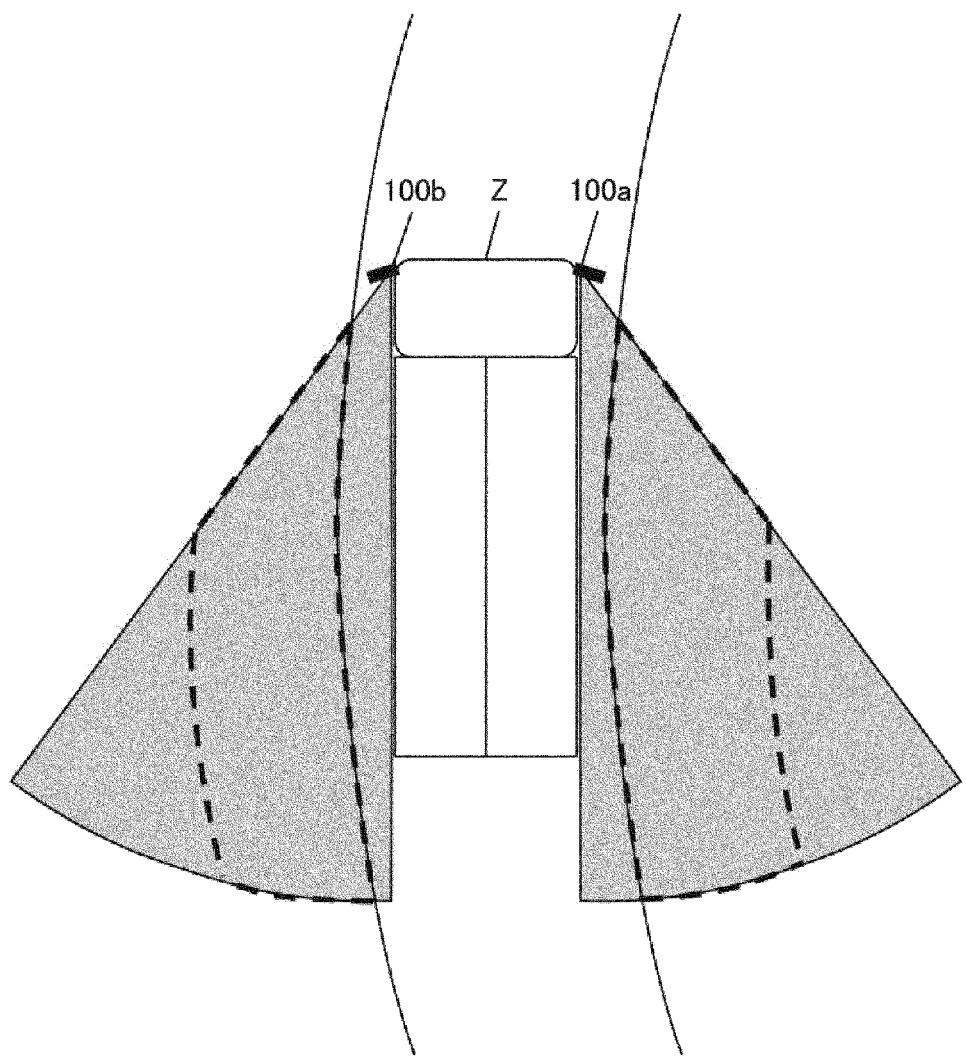
FIG. 22 illustrates a detection target range by an object detection apparatus in an object detection system according to an embodiment of the present disclosure.

The sub-controller 101 in the object detection system 1 according to an embodiment of the present disclosure may determine the detection target range based on the shape of the travel lane in which the vehicle Z is traveling, as illustrated in FIG. 22.

Figure 23:
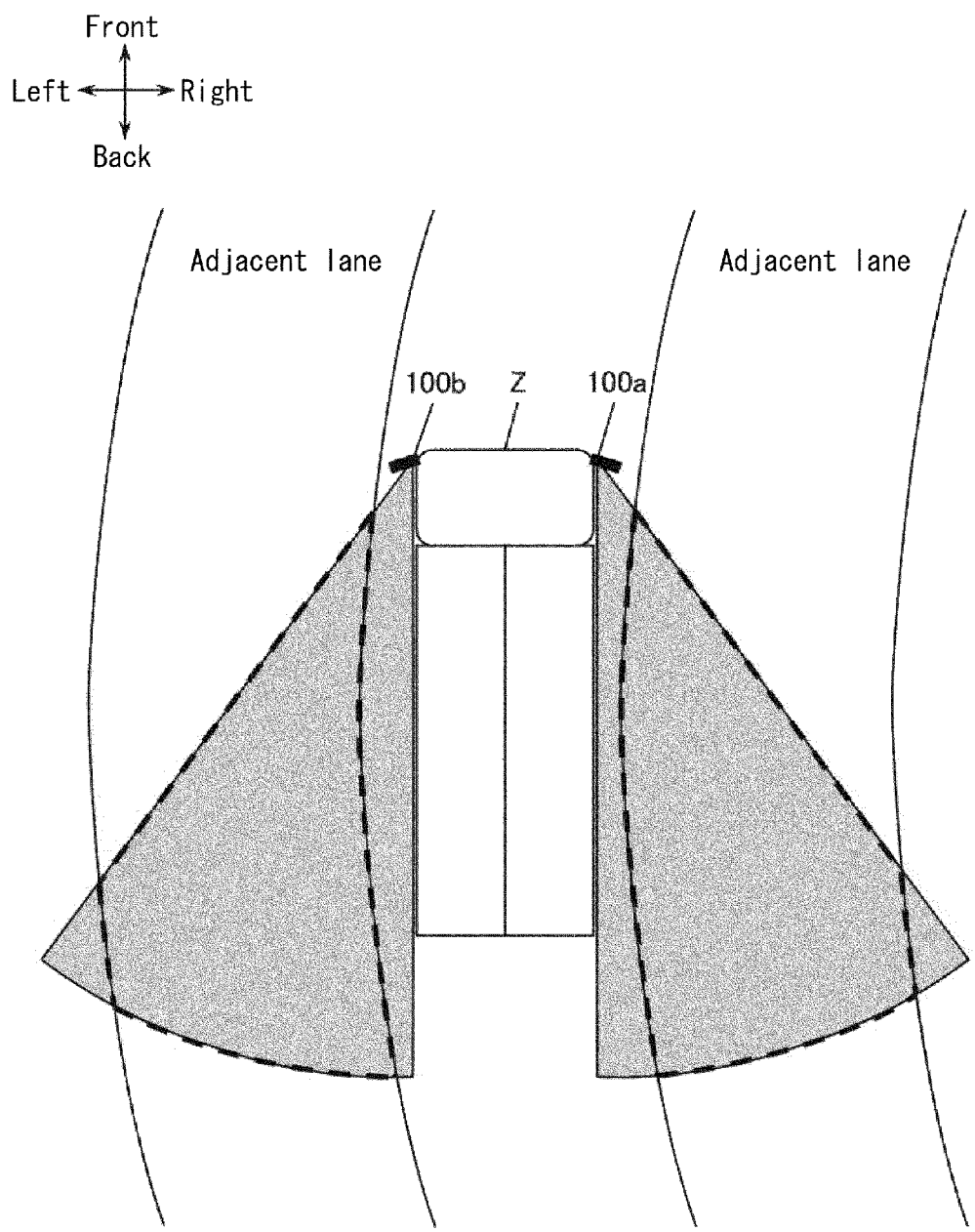
FIG. 23 illustrates a detection target range by an object detection apparatus in an object detection system according to an embodiment of the present disclosure.

The sub-controller 101 in the object detection system 1 according to an embodiment of the present disclosure may determine the detection target range based on the shape of the lane adjacent to the travel lane in which the vehicle Z is traveling, as illustrated in FIG. 23.

The sub-controller 101 may, for example, estimate the travel direction of the vehicle Z, the shape of the travel lane of the vehicle Z, or the shape of the lane adjacent thereto based on at least one of the steering angle of the vehicle Z, sensor information from a gyro sensor, an acceleration sensor, or the like, global positioning system (GPS) information, and map information.

In the object detection system 1 according to an embodiment of the present disclosure, the control apparatus 10 is a separate apparatus from the first object detection apparatus 100a and the second object detection apparatus 100b. One of the first object detection apparatus 100a and the second object detection apparatus 100b may, however, include the functions of the control apparatus 10.

It suffices for the object detection system 1 according to an embodiment of the present disclosure to include one or more object detection apparatuses 100.

The invention claimed is:

1. An object detection apparatus comprising:
an irradiator configured to irradiate a detection wave;
a detector configured to detect a reflected wave of the detection wave; and
a controller configured to estimate an arrival direction and a flight distance of the reflected wave;
wherein the controller is configured to perform an object detection process on a detection result of the reflected wave only when the arrival direction and the flight distance are included in a detection target range, the object detection apparatus is mounted in a vehicle, and the controller is configured to determine the detection target range based on at least one of a travel direction of the vehicle, a position of a travel lane in which the vehicle is traveling, a shape of a travel lane in which the vehicle is traveling, or a shape of a lane adjacent to a travel lane in which the vehicle is traveling.

2. The object detection apparatus of claim 1, wherein the controller is configured to determine an irradiation range of the detection wave based on the detection target range.

3. The object detection apparatus of claim 1, wherein the controller is configured to determine the irradiation range so as to include the detection target range.

4. The object detection apparatus of claim 1, wherein the controller is configured to determine the irradiation range so that the detection target range and the irradiation range overlap each other to a maximum degree.

5. The object detection apparatus of claim 2, wherein the irradiator is configured to irradiate the detection wave in the determined irradiation range.

6. The object detection apparatus of claim 1, wherein the controller is configured to detect an object at the flight distance in the arrival direction when an intensity of the reflected wave is a predetermined intensity or greater.

7. The object detection apparatus of claim 1, wherein the detection wave includes an electromagnetic wave or an ultrasonic wave.

8. An object detection system comprising:
an irradiator configured to irradiate a detection wave;
a detector configured to detect a reflected wave of the detection wave; and
a controller configured to estimate an arrival direction and a flight distance of the reflected wave;
wherein the controller is configured to perform an object detection process on a detection result of the reflected wave only when the arrival direction and the flight distance are included in a detection target range,
the object detection system is mounted in a vehicle, and
the controller is configured to determine the detection target range based on at least one of a travel direction of the vehicle, a position of a travel lane in which the vehicle is traveling, a shape of a travel lane in which the vehicle is traveling, or a shape of a lane adjacent to a travel lane in which the vehicle is traveling.

9. An object detection system comprising:
an irradiator configured to irradiate a detection wave;
a detector configured to detect a reflected wave of the detection wave;
a sub-controller configured to estimate an arrival direction and a flight distance of the reflected wave; and
a main controller configured to perform an object detection process on a detection result of the reflected wave only when the arrival direction and the flight distance are included in a detection target range,
wherein the object detection system is mounted in a vehicle, and
the main controller is configured to determine the detection target range based on at least one of a travel direction of the vehicle, a position of a travel lane in which the vehicle is traveling, a shape of a travel lane in which the vehicle is traveling, or a shape of a lane adjacent to a travel lane in which the vehicle is traveling.

10. The object detection apparatus of claim 1, wherein
the detection target range includes a first detection target range on a first side of the vehicle and a second detection target range on a second side of the vehicle that is opposite the first side of the vehicle, and
a size or shape of the first detection target range is different than a size or shape of the second detection target range.

11. The object detection system of claim 8, wherein
the detection target range includes a first detection target range on a first side of the vehicle and a second detection target range on a second side of the vehicle that is opposite the first side of the vehicle, and
a size or shape of the first detection target range is different than a size or shape of the second detection target range.

12. The object detection system of claim 9, wherein
the detection target range includes a first detection target range on a first side of the vehicle and a second detection target range on a second side of the vehicle that is opposite the first side of the vehicle, and
a size or shape of the first detection target range is different than a size or shape of the second detection target range.

* * * * *